United States Patent [19]
Takahashi et al.

[11] Patent Number: 4,768,396
[45] Date of Patent: Sep. 6, 1988

[54] ROTARY CAM ASSEMBLY

[75] Inventors: Shigeo Takahashi; Hiromi Hasegawa; Yutaka Taga, all of Aichi, Japan

[73] Assignees: Aisin Seiki Kabushiki Kaisha; Toyota Jidosha Kabushiki Kaisha, both of Aichi, Japan

[21] Appl. No.: 132,632

[22] Filed: Dec. 9, 1987

Related U.S. Application Data

[63] Continuation of Ser. No. 824,240, Jan. 30, 1986, abandoned.

[30] Foreign Application Priority Data

Jan. 30, 1985 [JP] Japan .................................. 60-16965

[51] Int. Cl.⁴ ...................... F16H 53/00; F16K 43/00
[52] U.S. Cl. ...................................... 74/567; 74/865; 74/867; 137/637; 137/315
[58] Field of Search .............. 74/567, 568 R, 568 FS, 74/568 M, 568 T, 569, 53–55, 865, 867; 123/90.6, 90.24, 90.25; 137/637, 315; 251/251, 263

[56] References Cited

U.S. PATENT DOCUMENTS

| | | | |
|---|---|---|---|
| 2,986,949 | 6/1961 | Lancaster et al. | 74/567 |
| 3,590,661 | 7/1971 | Chaveneaud | 74/567 |
| 3,800,621 | 4/1974 | Hoglund | 74/567 |
| 3,847,034 | 11/1974 | Hemens | 74/567 |
| 4,079,637 | 3/1978 | Nowak et al. | 74/567 |
| 4,193,321 | 3/1980 | King | 74/567 |
| 4,223,947 | 9/1980 | Cremer | 74/567 |
| 4,416,165 | 11/1983 | Kramer et al. | 74/567 |

FOREIGN PATENT DOCUMENTS 58-135547 9/1983 Japan .

Primary Examiner—Gary L. Smith
Assistant Examiner—Vinh Luong
Attorney, Agent, or Firm—Burns, Doane, Swecker & Mathis

[57] ABSTRACT

A rotary cam assembly includes a support shaft provided on a fixed bracket, a cam follower supported on the bracket so as to be slidably displaceable, a plate cam the outer circumferential portion of which has a cam surface contacted by the cam follower, the plate cam being freely rotatably mounted on the support shaft at a center hole, a cylindrical member extending along the central axis of the support shaft and having one end connected to the plate cam via coupling means formed in the center hole of the plate cam, and an input member connected to the other end of the cylindrical member for rotating the plate cam.

8 Claims, 10 Drawing Sheets ered by the contacting element by merely changing the plate cam.

ROTARY CAM ASSEMBLY

This application is a continuation, of application Ser. No. 824,240, filed Jan. 30, 1986 now abandoned.

BACKGROUND OF THE INVENTION

This invention relates to a rotary cam assembly and, more particularly, to a rotary cam assembly applicable to a throttle valve unit for displacing the pressure regulating means of throttle valves, which are arranged in the hydraulic circuit of an automatic transmission used in an automotive vehicle, in correspondence with the degree of throttle opening of an engine.

A rotary cam assembly generally comprises, taking a plate cam as an example, a cam surface formed on outer side of the cam, a cam follower, or contacting element, which contacts the cam surface for being reciprocatively displaced thereby, and an input member for rotating the cam plate.

An example of a rotary cam assembly applied to a throttle valve unit is as illustrated in FIGS. 15A and 15B. As shown, a plate cam 100 is formed to include a cam surface 101 on a portion of its outer periphery, a circular groove 102 in the remaining portion of its outer periphery, the groove 102 and the cam proper sharing the same center, and a center hole 103. A wire 110 has one end anchored at the left end of the groove 102 and has a portion of its length laid in the groove to form an input member. A fixed member 120 is provided with a support shaft 121 on which the cam plate 100 is rotatably mounted at its center hole 103. The fixed member 120 supports a plunger 130 capable of being slidably displaced. Attached for free rotation to the distal end of the plunger 130 by a pin 131 is a roller 132 serving as a contacting element in abutting contact with the cam surface 101.

SUMMARY OF THE DISCLOSURE

It will be appreciated from FIG. 15A that the plunger 130, roller 132, plate cam 100 and wire 110 in the illustrated arrangement all lie on the same plane. In a throttle valve unit to which a rotary cam assembly is applied, such a copolanar disposition of the elements presents difficulties because of the way in which the hydraulic circuitry of an automatic transmission is arranged. For example, it becomes necessary to displace the wire 100, namely the input member, upward or downward in FIG. 15A with respect to the plate cam 100, i.e., in the direction along which the central axis of support shaft 121 extends.

When attempting to perform a smoother change of speeds with an automatic transmission, as disclosed in the specification of Japanese Utility Model Kokai Publication No. 58-135547, it is considered to use a plurality of throttle valves and cause the valves to generate pressures having different throttle pressure characteristics corresponding to various conditions, and to control or actuate corresponding equipment in the hydraulic pressure circuitry on the basis of these throttle pressure characteristics.

In order to set a throttle pressure characteristic closer to a desired value, it is necessary to apply the cam means to the two throttle valves and separately set, as required, the displacement of the throttle valve pressure regulating means with respect to the rotation of the cam means.

This presents a problem in view of the requirement for smaller, lighter automatic transmissions for front-engine, front-wheel drive vehicles. Specifically, two throttle valve units must be housed in the limited confines of the transmission, the cam means must be provided for each of the throttle valves, and the engine throttle must be connected to each of the cam means.

Further, in order to mitigate or eliminate the shock sustained when changing speeds, it is necessary to design the cam surfaces while taking into account differences in engine output or differences in engine weight. However, with the throttle valve unit disclosed in the specification of Japanese Utility Model Kokai Publication No. 58-135547, the structure adopted is such that the levers are actuated by a rotary shaft journaled at an appropriate position in the transmission case and act to displace the plungers of the throttle valves. The levers are difficult to replace and this approach does not lend itself to a manufacturing process in which a wide variety of items are manufactured in small lots. The disclosed arrangement therefore is not entirely satisfactory.

Moreover, to fit the rotary cam assembly in a limited amount of space, the assembly must be made as small as possible. This makes it necessary to make the initial operating position L of the roller 132 as short as possible in view of the fact that the plate cam 100 must have a thickness M, shown in FIG. 15B, to assure sufficient strength.

It is a primary object of the present invention to satisfy the foregoing requirements and to solve the problems set forth above. Specifically, an object of the present invention is to provide a rotary cam assembly applicable to a throttle valve unit of an automatic transmission which can be housed in the limited confines of a transmission, which is capable of a design change that takes into account differences in engine output and differences in vehicle weight, which is suitable for a manufacturing process in which a wide variety of items are manufactured in small lots, and in which the cam has a configuration that minimizes sizes.

According to the present invention, the foregoing object is attained by providing a rotary cam assembly comprising a support shaft provided on a fixed member, a contacting element supported on the fixed member so as to be slidably displaceable, a plate cam having an outer circumferential portion formed to include a cam surface contacted by the contacting element and a central hole, the plate cam being freely rotatably mounted on the support shaft at the central hole, coupling means formed in the central hole of the plate cam, a cylindrical member extending along the central axis of the support shaft and having first and second ends, the first end being connected to the plate cam via the coupling means, and an input member connected to the second end of the cylindrical member for rotating the plate cam.

By virtue of this arrangement, the rotary cam assembly can be readily installed and disposed by suitably setting the length of the cylindrical member, even if the input member is displaced with respect to the plate cam in a direction extending along the central axis of the support shaft. Further, since the cylindrical member is connected by way of the coupling means formed in the center hole of the plate cam, a plate cam having a different shape can be suitably selected to readily set the stroke characteristic of the contacting element.

In a preferred embodiment, notches are formed in the central hole portion of the plate cam rotatably mounted on the fixed member, the first end of the cylindrical member is engaged with the notches, and the second end of the cylindrical member is connected to the input member, with the plate cam, the cylindrical member and the input member being coaxially supported on the support shaft. A bracket, for example, can be used as the fixed member, in which case the support shaft can be fixedly secured to the bracket.

The coupling means formed in the center hole portion of the plate cam can be notched formed in the inner wall portion of the center hole, a gear or spline-like portions formed on the inner and outer sides of bosses. Preferably, the coupling means is formed on the inner wall portion of the center hole at a part thereof remote from the initial position of the cam surface.

Resilient means for applying a restoring force to the rotary cam can be provided. Selecting a torsion spring as the resilient means enables the assembly to be made small in size. In such case, the torsion spring is wound on the outer periphery of the cylindrical portion. One end of the spring is fastened to either the plate cam or input member, and the other end of the spring is fastened elsewhere.

The input member is connected on either side of the plate cam in suitably spaced relation with respect thereto.

If the rotary cam assembly of the present invention is applied to a throttle valve unit of an automatic transmission, pressure regulating means of the throttle valve is provided with a roller as the contacting element, and the roller is made to contact the cam surface. The input member, moreover, is connected to the throttle of the engine. In such case, the cam face of the plate cam for displacing the pressure regulating means of the throttle valve in dependence upon throttle opening is formed to have a shape that will enable the desired throttle pressure characteristic to be obtained.

The rotary cam assembly of the present invention can also be applied to a throttle valve unit equipped with a plurality of throttle valves. In such an arrangement, a plate cam serving as one cam can be combined with one of the throttle valves, and a cam face formed on the input member can be combined with another throttle valve to serve as another cam.

In the operation of this throttle valve unit with plural valves, cams are rotated by the input member, which is operatively associated with the engine throttle, when the accelerator pedal is depressed. The cam faces, which are formed such that desired throttle pressure characteristics will be obtained in dependence upon throttle opening, displace the plungers of the throttle valves to vary the pressure regulating means. Since cams are set in correspondence with two respective throttle valves, these valves produce throttle pressures that improve the speed-change performance. One of the throttle pressures produced in the respective valve in accordance with throttle opening is used as back pressure for deciding line pressure, thereby supplying the hydraulic equipment with pressured oil in an accurate manner. The other of the throttle pressures produced in the respective valve acts upon a shift valve as back pressure opposing governor pressure, thereby deciding precise changeover timing of the shift valve. When the plungers are employed as valves for changing over the hydraulic equipment, the hydraulic equipment is operated precisely in dependence upon throttle opening. If the amount by which the accelerator pedal is depressed is increased, the cams are rotated further; if decreased, the cams are restored by the pressure regulating means or by the resilient means.

ADVANTAGES OF THE INVENTION

With a throttle valve unit to which the present invention is applied, first and second cams are connected by the coupling means. Therefore, the cam profiles of the cam faces on both cams can be set as desired so that any hydraulic pressure characteristic corresponding to a single input (throttle opening) can be obtained. In addition, the first and second cams can be replaced to alter the hydraulic pressure characteristics in accordance with a difference in engine output or vehicle weight. The valve unit therefore readily lends itself to an era in which parts of diverse types are produced in small lots and, hence, is of great industrial value. Furthermore, since resilient means such as a torsion spring can be provided between both cams, the overall throttle valve assembly can be made compact so that two throttle valves can be arranged in the limited space of an automatic transmission case. Cam means can be provided for each throttle valve and each cam can readily be coupled with the engine throttle.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

An embodiment of the present invention will now be described with reference to FIGS. 1 through 5C, though it should be understood that the invention is not limited to the illustrated embodiment.

Figure 1:
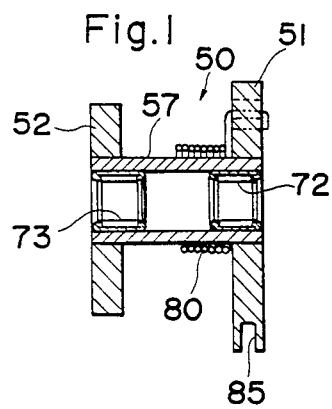
FIG. 1 is a sectional view illustrating a principal portion of an embodiment of a rotary cam assembly according to the present invention.
Figure 2:
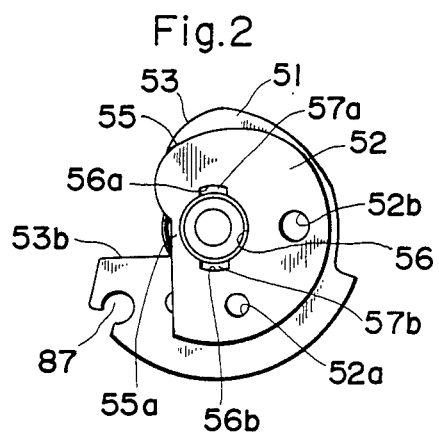
FIG. 2 is a side view of the rotary cam assembly shown in FIG. 1.
Figure 3:
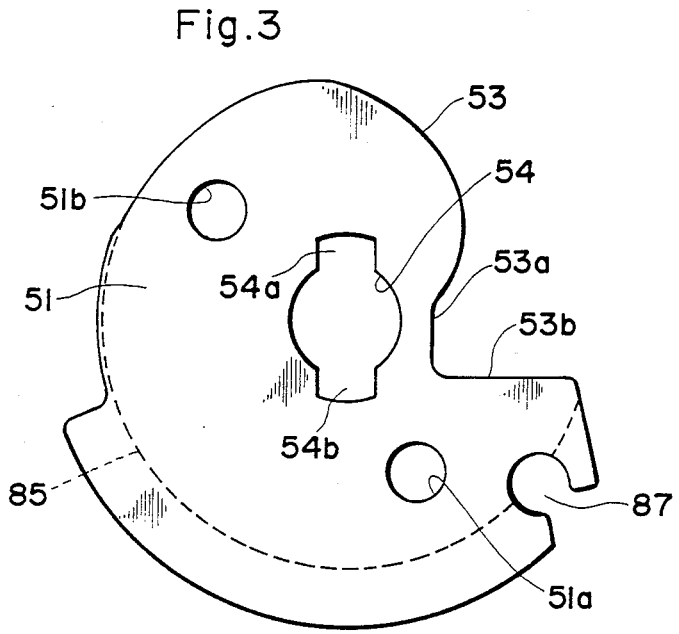
FIG. 3 is a side view of a first cam of the cam assembly, the first cam constituting an input member.
Figure 4:
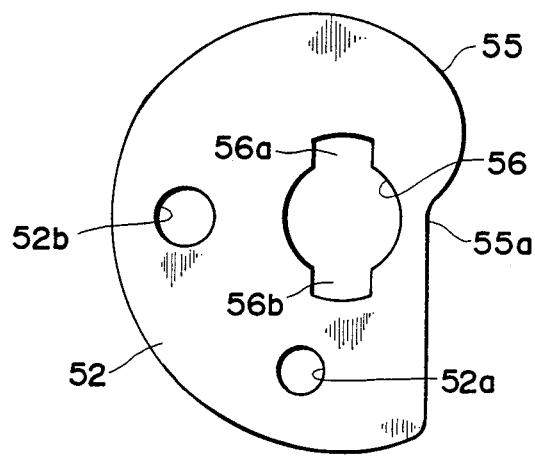
FIG. 4 is a side view of a plate cam of the cam assembly.
Figure 5A:
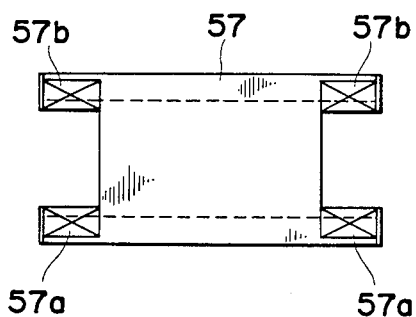
FIG. 5A is a plan view of a cylindrical member of the cam assembly.
Figure 5B:
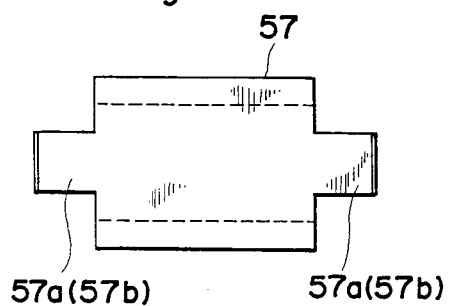
FIG. 5B is a front view of the cylindrical member.
Figure 5C:
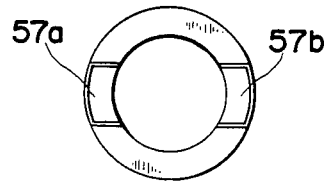
FIG. 5C is a side view of the cylindrical member.

Cam means indicated generally by the reference numeral 50 comprises a first cam 51 the outer circumferential portion of which is formed to include a cam surface 53 as required, a second or plate cam 52 formed to include a cam face 55 on its outer circumferential portion, and a cylindrical portion 57 connecting the first and second cams 51, 52. The first cam 51 is constituted by a plate-shaped member the outer circumferential portion whereof is provided with a concentric groove 85 and which is formed to include a notch in which an end portion of a cable or the like is anchored. The cylindrical member is formed to include diametrically opposed fingers 57a, 57b on each end thereof, as shown in FIGS. 5A, 5B and 5C. Each finger 57a, 57b has the sides extending parallel with each other and the section thereof is a part of the cylindrical member (i.e., inner and outer surfaces are co-centered). As shown in FIGS. 3 and 4, the first cam 51 has a center hole 54 the inner wall portion of which is formed to include diametrically opposed notches 54a, 54b. Both sides of the notches 54a, 54b extend parallel with each other and the bottom surface thereof is cocentric with the center hole 54. Likewise, the second cam 52 has a center hole 56 of the inner wall portion of which is formed to include diametrically opposed notches 56a, 56b. The first and second cams 51, 52 and the cylindrical member 57 are interconnected to form an integrated body by fitting the fingers 57a, 57b at one end of the cylindrical member 57 notches 54a, 54b of the first cam 51 and fitting the fingers 57a, 57b at the other end of the cylindrical member 57 into the notches 56a, 56b of the second cam 52. Needle roller bearings 72, 73 are press-fitted into the center holes 54, 56, respectively.

The first and second cams 51, 52 are formed by being punched from a plate material. Disposed on the outer periphery of the cylindrical member 57 is a torsion spring 80 serving as resilient means for applying a restoration force to the cam means.

The cam means 50 of the above-described construction is applied in a throttle valve unit. The cam means 50 is rotatably supported on a support shaft 71, which is in turn supported by a bracket 60 serving as a fixed member. The throttle valve unit, bracket and support shaft will be described in further detail later.

The bearings 72, 73 are not limited to the needle roller bearings mentioned above. Other bearings which can be used are bimetal-type slip bearings or ball bearings. If the conditions of use allow, the support shaft can be passed loosely through the center holes directly without the intermediary of bearings.

With the first cam 51, a second cam 52 and cylindrical member 57 interconnected into a unitary body in the manner set forth above, the joints between the fingers 57a, 57b of the cylindrical member 57 and the notches 54a, 54b and 56a, 56b formed in the center holes 54, 56 can be made fast by bonding. Alternatively, the fingers 57a, 57b on the left and right ends of the cylindrical member 57 in FIG. 1 can be welded to the side faces of the first cam 51 and second cam 52 to firmly secure the cams to the cylindrical member.

The straightness or coaxial precision of the center holes through which the support shaft is passed can be enhanced by subjecting these holes to finishing machining after they have been subjected to the bonding or welding treatment mentioned above. To achieve this, it will suffice if the cam centers are determined on the basis of references holes 51a, 51b and 52a, 52b formed in the cams 51 and 52, respectively, at the same time that the cams are punched.

The notches 54a, 54b and 56a, 56b formed in the wall portions of the center holes 54 and 56 of the first cam 51 and second cam 52, respectively, are provided at positions (such as the positions shown in the drawings) remote from the initial positions 53a, 55a of the cams surfaces 53, 55, respectively. By doing so, the above-mentioned thickness M can be assured, so that the initial operating position of the contacting element can be shortened to the maximum extent, thus enabling the rotary cam assembly to be made small in size. The notches 54a, b and 56a, b are disposed preferably parallel with the initial positions 53a and 55a, respectively.

Let us now describe an embodiment in which the rotary cam assembly of the present invention is incorporated in an automatic transmission throttle valve unit, particularly a throttle valve unit having a plurality of throttle valves.

Figure 7:
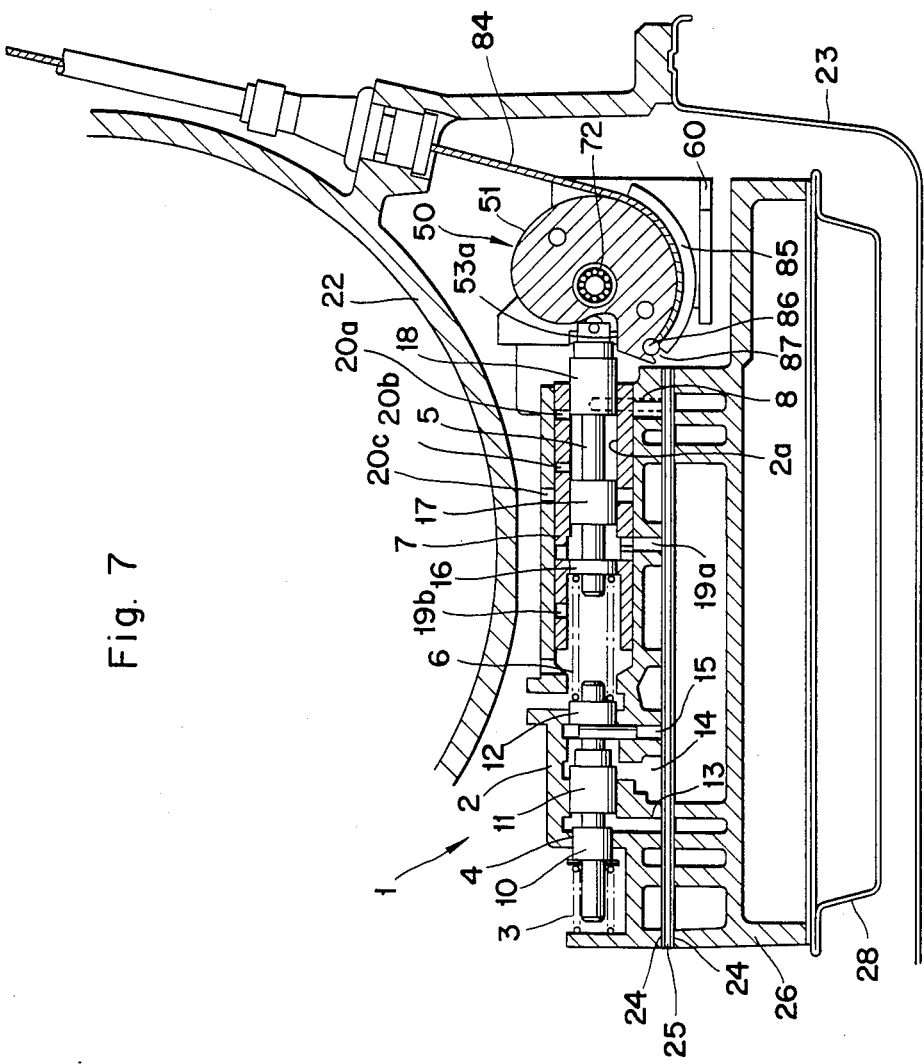
FIG. 7 is a sectional view taken along line VII—VII of FIG. 6.

A first throttle valve 1 illustrated in FIG. 7 is a throttle valve for shift control, the valve having an output port connected to one back pressure port of a plurality of shift valves. The first throttle valve cooperates with governor pressure connected to the other back pressure port of each shaft valve to actuate the shift valves and suitably select friction engaging devices connected to the shift valves, thereby performing a speed change conforming to the throttle opening and vehicle speed. The first throttle valve 1 also sends a release signal to a lock-up relay valve at a throttle opening near zoer. In response to the signal from the first throttle valve, the lock-up relay valve breaks a direct connection between the turbine and the pump of a torque converter.

The first throttle valve 1 has a spool 4 backed at one end (the left end in the figure) by a spring 3, a plunger (valve element) 5 arranged in series with the spool 4, and a pressure regulating spring 6 serving as pressure regulating means arranged between the spool 4 and the plunger 5, these elements being provided in a valve body 2. The plunger 5 is guided by a sleeve 7, which is secured to the valve body 2 by a pin 8. The spool 4 is formed to include three lands 10, 11, 12 in the other mentioned starting from the side on which the backing spring 3 is located, and the valve body 2 is formed to include three ports 13, 14, 15 corresponding to the three lands 10, 11, 12, respectively. In the illustrated embodiment, the lands 11, 12 have the same diameter, which is larger than that of the land 10. The central port 14 supplies pressured oil from the pump. The right port 15 is an output port connected to the port 13, which is a back pressure port, via throttling means, and is also connected to back pressure ports opposing the governor pressure of the shift valves.

The plunger 5 also is formed to include three lands 16, 17, 18. The valve body 2 is formed to include five ports 19a, 19b, 20a, 20b, 20c through the sleeve 7 to correspond to the lands. The port 19a on the left side is connected to the port 13 on the side of the spool 4. When the throttle is approximately wide open, communication is established between the port 19b and a port of one of the shift valves, e.g., a 3-4 shift valve. The output of the port 19b in this case is employed as a kick-down signal. The port 20a is provided very close to the land 18 of the plunger 5 and serves to introduce pump pressure at a throttle opening near zero. The port 20b is an output port conected to the back pressure port of the lock-up relay valve. The port 20c is located just to the left of the output port 20b and is used as the discharge port of the lock-up relay valve.

The first throttle valve 1 is arranged between a transmission case 22 and an oil pan 23. A lower valve body 26 is arranged below the valve body 2 so that a gasket 24 and a plate 25 are sandwiched between the valve bodies. A strainer 28 is provided beneath the lower valve body 26.

Figure 8:
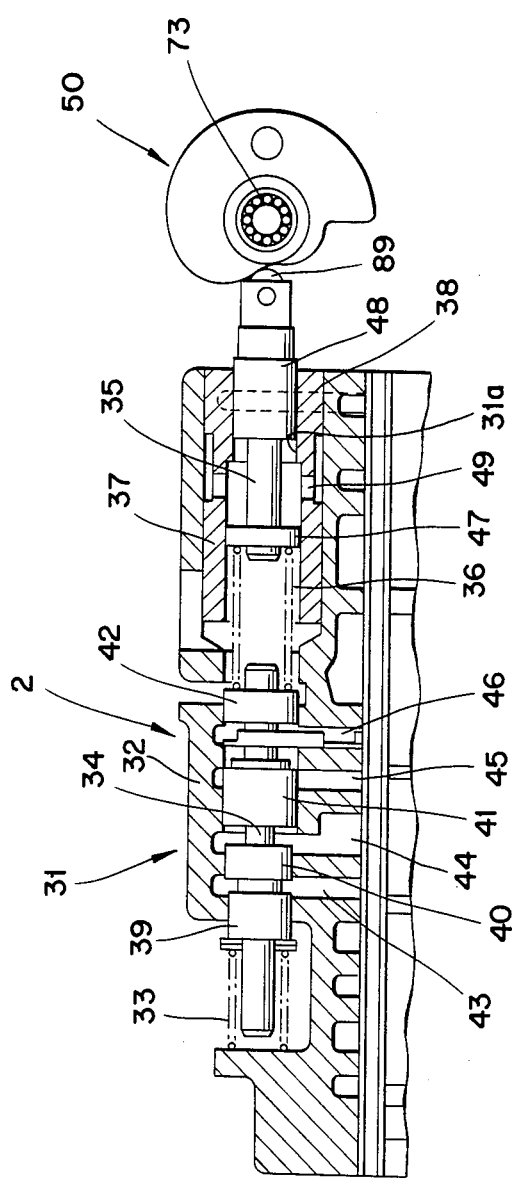
FIG. 8 is a sectional view taken along line VIII—VIII of FIG. 6.
Figure 9:
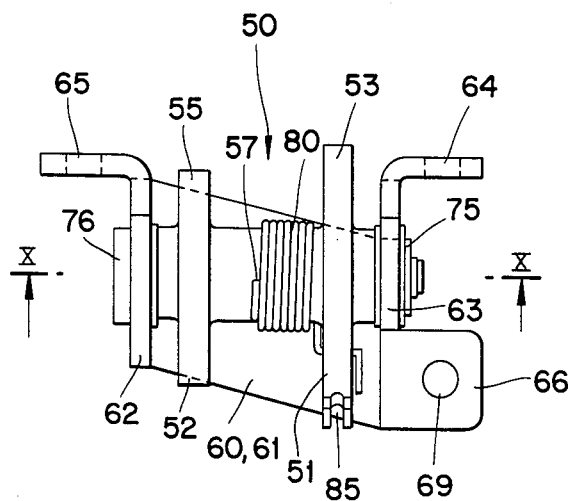
FIG. 9 is a plan view of a bracket accommodating cam means.
Figure 10:
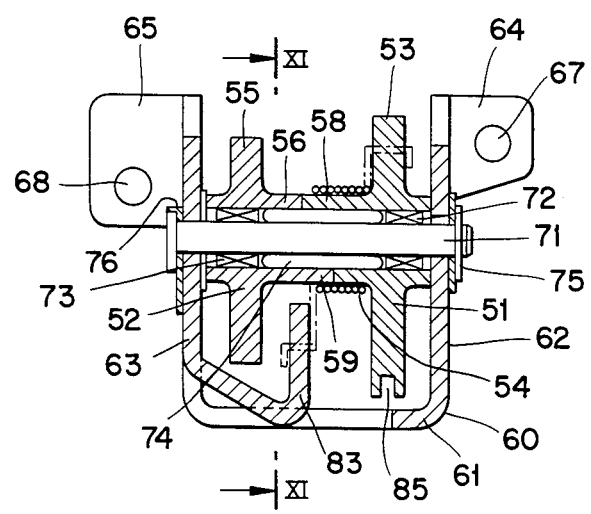
FIG. 10 is a sectional view taken along line X—X of FIG. 9.

A second throttle valve 31 is constructed as shown in FIG. 8. The second throttle valve 31 is for control of main pressure and causes hydraulic pressure, which is regulated in dependence upon throttle opening, to act as back pressure of a regulator valve, whereby the pressured oil from the pump is made to conform to throttle opening to regulate the main pressure in the oil line.

The second throttle valve 31 has a spool 34 backed at one end (the left end in the figure) by a spring 33, a plunger 35 arranged in series with the spool 34, and a pressure regulating spring (pressure regulating means) 36 arranged between the spool 34 and the plunger 35, these elements being provided in a valve body 32 constructed adjacent to and integral with the valve body 2 of the first throttle valve 1. The plunger 35 is guided by a sleeve 37, which is secured to the valve body 32 by a pin 38.

The spool 34 is formed to include four lands 39, 40, 41, 42 in the other mentioned starting from the side on which the backing spring 33 is located. In the ilustrated embodiment, the lands 41, 42 have the same diameter, which is larger than that of the land 40, with the diameter of the latter being larger than that of the land 39. The valve body 32 is formed to include four ports 43, 44, 45, 46 corresponding to the four lands 39, 40, 41, 42, respectively. The port 45 is an input port for receiving an input from the pump. Pressured oil regulated by the land 41 is delivered from the port 46. The port 46 communicates with a regulator valve back pressure port, with a drain port via throttling means, with the port 43 via a cut-back valve, and with the port 44 via throttling means. The cut-back valve is actuated by governor pressure for communicating the port 46 with the port 43.

The plunger 35 also is formed to include two lands 47, 48, the diameter of the former being larger than that of the latter. The valve body 32 is formed to include one port 49 through the sleeve 37. The port 49 communicates with the back pressure port 43 on the side of the spool 34. Pressured oil which enters from the port 49 acts to move the plunger 35 to the left in FIG. 8.

Figure 6:
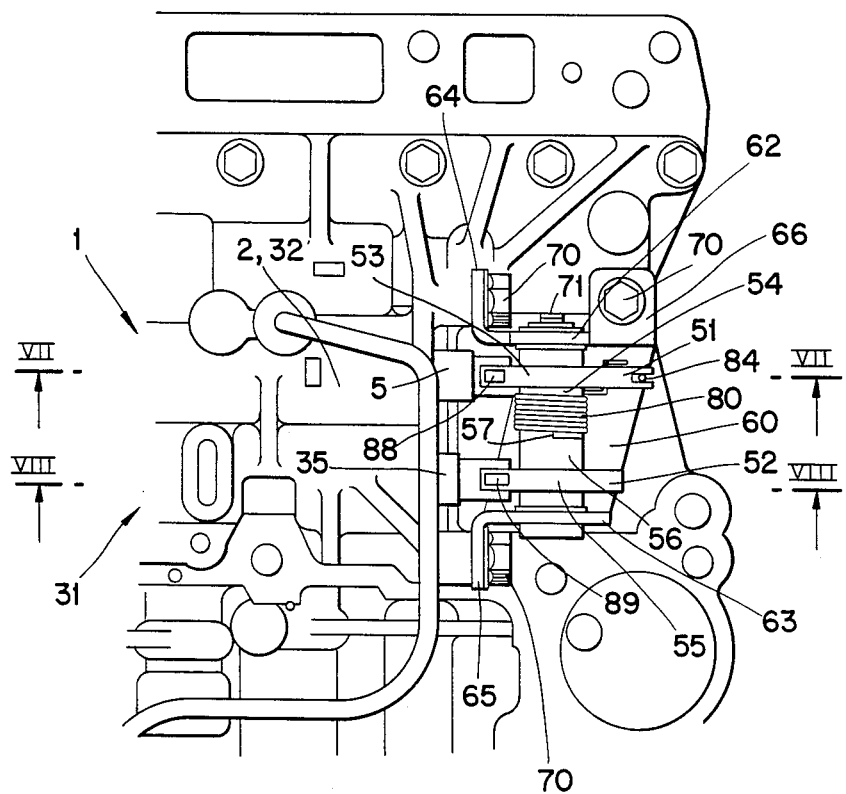
FIG. 6 is a plan view showing a throttle valve unit to which the rotary cam assembly of the present invention is applied.

As shown in FIG. 6, the two throttle valves 1, 31 are arranged in parallel and adjacent to each other with the plunger sides thereof in alignment. In the figure the second throttle valve 31 is shown to be arranged in front of the first throttle valve 1.

As shown in FIGS. 9 through 12, the cam means 50 comprises the first cam 51 for displacing the plunger 5 of the first throttle valve 1, and the second cam 52 operatively associated with the first cam 51 for displacing the plunger 35 of the second throttle valve 31.

The first cam 51 has the cam face 53 formed on its outer periphery for displacing the plunger 5, and is formed to include the concentric notches 54a, 54b on the inner wall of the center hole 54. It will be appreciated from FIG. 7 that the cam face 53 is provided with a stopper 53b which determines the position of the cam 51 by abutting against the plunger 5 when the throttle opening is zero. The second cam 52 likewise has the cam face 55 formed on its outer periphery for displacing the plunger 35, and is formed to include the concentric notches 56a, 56b in the inner wall of the center hole 56. The fingers 57a and 57b at both ends of the cylindrical member 57 are fitted into the notches 54a, 54b and 56a, 56b, respectively, in such a manner that the second cam 52 can be rotated in operative association with the first cam 51. These fingers 57a, 57b and notches 54a, 54b, 56a, 56b constitute coupling means. In order that the first and second cams 51, 52 will move in unison, the two notches formed in the inner wall portions of each center holes 54, 56 are symmetrically located, as shown in the drawings, the two fingers are formed at each end of the cylindrical member 57 at positions corresponding to the notches and the fingers are fitted into the corresponding notches.

A bracket 60 (FIG. 10) for accommodating the cam means 50 comprises a base portion 61, generally parallel side portions 62, 63 formed by bending the base portion 61 upward from both sides thereof, first mounting portions 64, 65 and a second mounting portion 66 formed by bending the two side portions 62, 63. The overall bracket 60 has a U-shaped configuration. The two mounting portions 64, 65 are bent so as to lie parallel to the front faces of the respective throttle valves 1, 31, and the remaining mounting portion 66 (FIG. 9) is bent so as to lie perpendicular to these front faces. The mounting portions 64, 65, 66 are formed to include respective bolt holes 67, 68, 69. The bracket 60 is bolted directly to the front side of the valve bodies 2, 32, which are constructed to adjoin each other in the form of an integral body, by three bolts 70.

The cam means 50 is supported in the bracket 60 by a support shaft 71 passed through the two side portions 62, 63 of the bracket 60. The bearings 72, 73 are arranged between the support shaft 71 and the cam means 50 to facilitate rotation. A collar 58 is interposed between the side portion 62 of bracket 60 and the cam means 50, and a collar 59 is interposed between the opposing side portion 63 of the bracket 60 and the cam means 50, thereby positioning the cam means 50 axially at a prescribed location inside the bracket 50.

It should be noted that the support shaft 71 is prevented from falling out by a snap ring 75 fitted thereon on the outer side of the side portion 62 of bracket 60.

Figure 11:
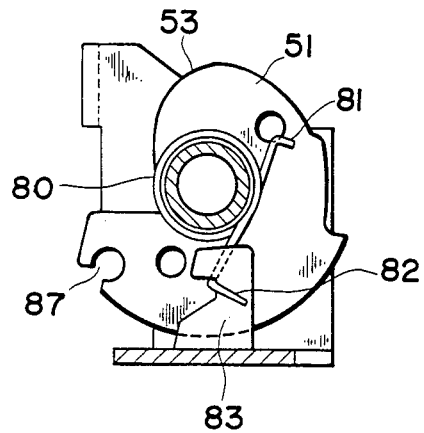
FIG. 11 is a sectional view taken along line XI—XI of FIG. 10.
Figure 12:
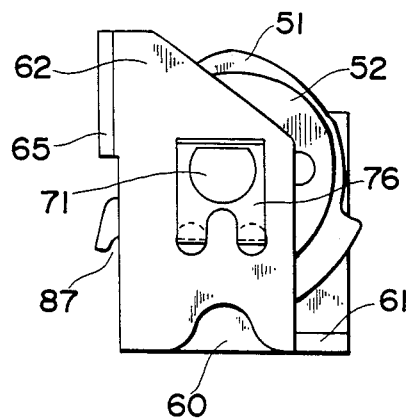
FIG. 12 is a side view of the bracket of FIG. 10 as seen from the left side.

Resilient means 80 for restoring the cam means 50 is constituted by a torsion spring. The torsion spring 80 is wound on the outer periphery of the cylindrical member connecting the two cams 51, 52. One end 81 of the torsion spring 80 is anchored to a suitable portion of the first cam 51, and the other end 82 of the torsion spring is anchored to a hook portion 83, which is formed in the bracket 60 by cutting away a portion of the bracket, in such a manner that the torsion spring 80 itself is torsioned to a some extent (FIG. 11). The end 81 of the torsion spring 80 can also be anchored to the second cam 52, which operates in association with the first cam 51.

As shown in FIG. 7, the input member may use a cable 84 for rotating the cam means 50 in dependence upon the throttle opening of the engine. One end of the cable 84 is connected to the engine throttle. The other end of cable 84 is guided by the groove 85 formed in the outer periphery of the first cam 51 at a portion thereof that does not constitute the cam face 53. An anchor piece 86 at the tip of the cable 84 is fit snugly into the recess 87 formed in the outer periphery of the cam 51 at a suitable position thereof.

Rollers 88, 89 are arranged at the distal ends of the plungers 5, 35 that contact the cam faces of the first and second cams 51, 52, thereby assuring smooth rotation of the first and second cams 51, 52.

Figure 13:
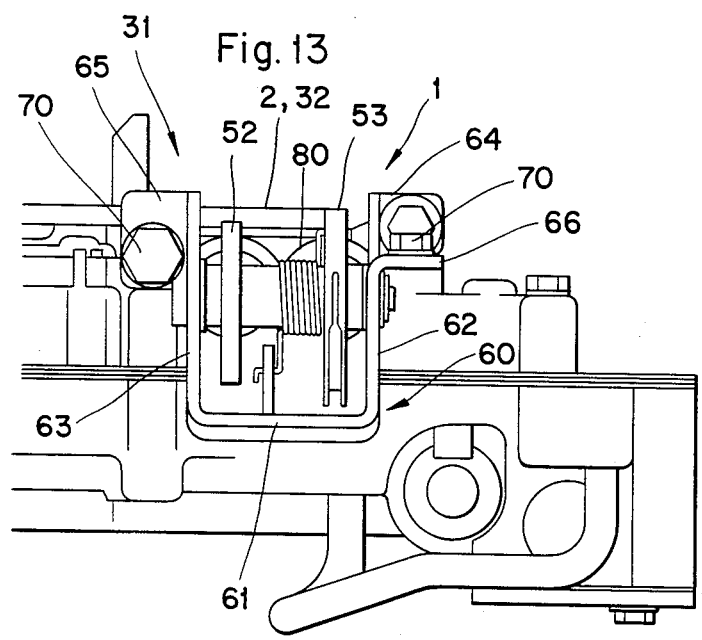
FIG. 13 is a front view of the unit shown in FIG. 6.

To assemble the throttle valve arrangement having the above-described construction, the torsion spring 80 constituting the resilient means is wound around the cylindrical member 57 connecting the first and second cams 51, 52, and fingers 57a, 57b at each end of the cylindrical member 57 are fitted into the corresponding notches 54a, 54b and 56a, 56b of the first and second cams 51, 52. The bearings 72, 73 are then fitted into the cams 51, 52 from the outer sides thereof to be disposed on both sides of the retaining member 74. The cam means 50 thus assembled is received in the bracket 60 from the upper part thereof in such a manner that both side faces of the cam means lie parallel to the side portions 62, 63 of the generally U-shaped bracket 60. The cam means 50 is supported by the support shaft 71, which is inserted from the side portion 62 of the bracket 60 and passed through the collar 59, the bearing 73, the interior of the cylindrical member 57, the bearing 72, the collar 58 and the side portion 63 of the bracket. The support shaft 71 is held in place by the snap ring 75 fitted onto the support shaft 71 from the outer side of the side portion 62 of bracket 60. The support shaft 71 is prevented from rotating by a member 76 inserted from the outer side of the opposing side portion 63 of bracket 60. Next, one end of the torsion spring 80 is securely fastened to the first cam 51 at a suitable location thereon, and the other end of the torsion spring 80 is fastened to the hook 83 of the bracket 60 so as to apply torsion to the spring. The bracket 60 thus assembled is fastened to the front side of the integrated valve bodies 2, 32. This is accomplished by fastening the first mounting portions 64, 65 lying parallel to the front side of the valve bodies, as well as the mounting portion 66 lying perpendicular to the valve bodies, to the valve bodies 2, 32 proper by bolts 70. As shown in FIGS. 6 and 13, the bracket 60 is secured directly to the valve bodies 2, 32 at three points and in two perpendicular planes. This raises positional precision and minimizes any error in throttle pressure setting caused by the mounting method. Finally, the locking piece 86 of the cable 84 is fitted into the recess 87 of the first cam 51 and the cable is disposed in the groove 85 of the first cam 51. The rear end of the cable 84 is connected via a support member to a part such as the accelerator pedal operatively coupled to the engine throttle.

When, e.g., the accelerator pedal of a vehicle equipped with the above-described throttle valve unit is depressed, the throttle of the vehicle engine opens to an extent commensurate with the amount of pedal depression and, in operative association with the accelerator pedal, the cable 84 guided in the peripheral groove 85 of the first cam 51 is pulled. The first cam 51 is rotated by the cable 84 by an amount corresponding to the amount of accelerator pedal depression, and the first cam 51 rotates the second cam 52 through the coupling means 57 operatively coupling the two cams together.

Owing to the rotation of the cams 51, 52, the plungers 5, 35 are made to follow up this motion inside the sleeves 7, 37 via the rollers 88, 89 abutting against the cam faces 53, 55, thereby separately compressing the respective pressure regulating springs 6, 36 to subject them to loads of different magnitude. The supplied hydraulic pressure is regulated in dependence upon the loads applied to the springs 6, 36, with the respective throttle pressures being delivered from the output ports 15, 46.

If the amount of accelerator pedal depression is reduced, the cams 51, 52 are rotated in the opposite direction by the pressure regulating springs 6, 36 and torsion spring 80 up to the degree of throttle opening. The plungers 5, 35 act by following up this movement of the cams and perform a valving operation of the kind described above.

Figure 14:
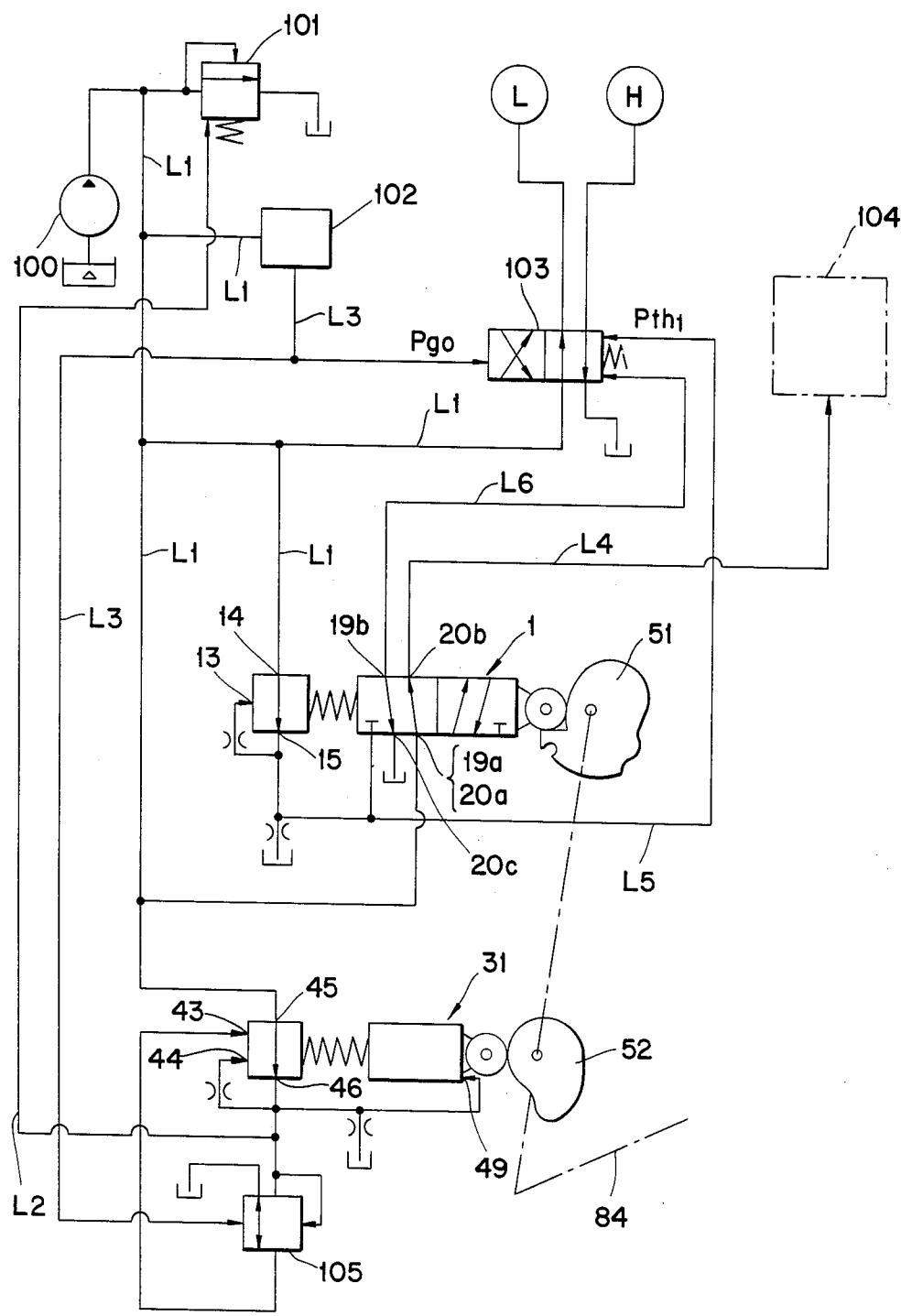
FIG. 14 is a view of hydraulic circuitry used in a throttle valve unit incorporating the rotary cam assembly of the present invention.
Figure 15A:
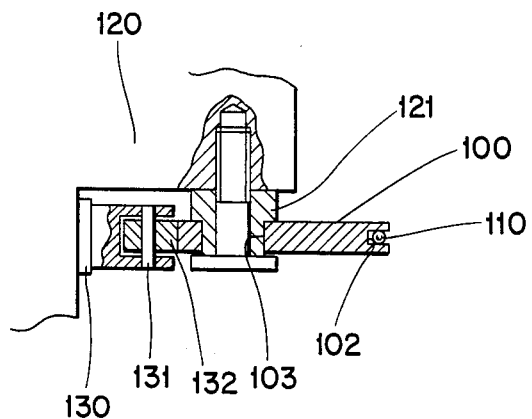
FIG. 15A is a plan view, partially shown in section, illustrating an example of a rotary cam assembly.
Figure 15B:
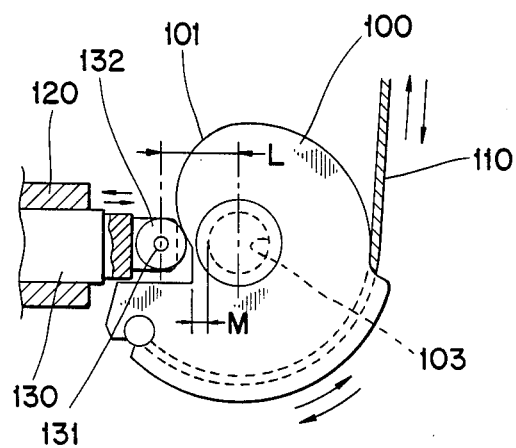
FIG. 15B is a front view of the cam assembly of FIG. 15A.

The operation of this throttle valve unit will now be described in conjunction with the hydraulic circuit diagram shown in FIG. 14, in which numeral 100 denotes a pump, 101 a regulator valve, 102 a governor valve, 103 a shift valve, e.g., a 3–4 shift valve, 104 a lock-up control circuit and 105 a cut-back valve.

When the vehicle engine is started, pressured oil from the pump 100 is fed via a line L1 to the regulator valve 101, governor valve 102, shift valve 103, input ports 14, 19a, 20a of the first throttle valve 1, and input port 45 of the second throttle valve 31. Main pressure in line L1 applied to the port 45 of second throttle valve 31 is regulated by the spring 36 and is delivered as throttle pressure from the port 46. This throttle pressure is fed back to the back pressure port 49 on the side of the plunger 35 and through an orifice to the back pressure port 44 on the side of the spool 34, thereby subjecting throttle pressure to further regulation. The throttle pressure of the second throttle valve 31 acts upon a back pressure port of the regulator valve 101 through a line L2, and main pressure in the line L1 is regulated to a pressure in conformance with the throttle opening by the regulator valve 101.

Main pressure in line L1 applied to the port 14 of first throttle valve 14 is regulated by the spring 6 and is delivered as throttle pressure from the port 15. This throttle pressure ordinarily is set to a value different from that of the throttle pressure of the second throttle valve 31. The throttle pressure of the first throttle valve acts upon one back pressure port of the shift valve 103 via a line L5.

The governor valve 102 delivers an output corresponding to vehicle speed to a line L3. The output on line L3 acts as governor pressure on the other back pressure port of the shift valve 103, namely on the back pressure port that opposes the throttle pressure. It also acts upon one back pressure port of the cut-back valve 105.

When the accelerator pedal connected to the cam 51 by the cable 84 is depressed by only a small amount so that the throttle opening is substantially near zero, the ports 20a, 20b of the first throttle valve 1 communicate and main pressure in line L1 is delivered to the lock-up control circuit 104 via a line L4. During the time that the pressure in line L4 is applied thereto, the lock-up control circuit 104 operates the torque converter in an ordinary manner.

When the accelerator pedal is depressed slightly from the condition in which the throttle opening is near zero, the cam 51 and the cam 52 operatively associated therewith are rotated by the cable 84 connected to the accelerator pedal, whereby the ports 20b, 20c of the first throttle valve are communicated. The pressure in line L4 vanishes owing to the communication between these two ports, so that the lock-up control circuit 104 is directly coupled to the pump and turbine of the torque converter. The plunger 5 is displaced by rotation of the cam 51, thereby compressing the pressure regulating spring 6 to raise the output from port 15 and enlarge the force acting upon the shift valve 103. At the same time, the plunger 35 of the second throttle valve 31 is displaced by rotation of the cam 52, thereby compressing the pressure regulating spring 36 to increase the output from port 46. Through the discharge output of the pump 100 increases with an increase in the output of the vehicle engine, the output from port 46 of the second throttle valve 31 acts upon the regulator valve 101, so that the main pressure in line L1 is made proportional to the throttle opening. With a further increase in throttle opening, the vehicle speed rises and the output of the governor valve 102 also rises in an abrupt manner.

Further depression of the accelerator pedal causes an increases in the throttle opening, whereupon the governor pressure acting on the shift valve 103 overcomes the throttle pressure of the first throttle valve 1 so that the shift valve 103 changes over to effect a speed change from L to H.

When the throttle opening reaches the vicinity of 85 cc owing to further depression of the accelerator pedal, the ports 19a, 19b of the first throttle valve 1 are communicated by displacement of the plunger 5 caused by rotation of the cam 51 connected to the accelerator pedal by the cable 84. The communication between these ports allows the main pressure in line L1 to act, in opposition to governor pressure, on the shift valve 103 through a line L6. Kick-down is performed as a result.

In an operation separate from that just described, the cut-back valve 105 is actuated by governor pressure when a certain vehicle speed is attained, and the port 46 of the second throttle valve 31 is brought into communication with the port 43 of valve 31. Communication between these two ports reduces the output from port 46 and increases the amount of leakage at the regulator valve 101, with the result that main pressure in line L1 drops and is held at a predetermined value.

When the amount of accelerator pedal depression is reduced to diminish the throttle opening, operation is the reverse of the described above.

As many apparently widely different embodiments of the present invention can be made without departing from the spirit and scope thereof, it is to be understood that the invention is not limited to the specific embodiments thereof except as defined in the appended claims.

What is claimed is:

1. A rotary cam assembly comprising:
   a nonrotatable support shaft secured to a fixed member;
   first and second contacting elements each displaceably supported on said fixed member;
   a plate cam having an outer circumferential portion formed to include a first cam for being contacted by said first contacting element, said plate cam having a center hole through which said support shaft is passed for rotatably mounting said plate cam thereon, and at least one notch being provided in the center hole of said plate cam;
   an input member including a plate-shaped body having an outer circumferential portion formed to include a second cam surface for being contacted by said second contacting element, said input member having a center hole through which said support shaft is passed for rotatably mounting said input member thereon, and at least one notch being provided in the center hole of said input member; and
   a cylindrical member through which said support shaft is rotatably passed in relation thereto, said cylindrical member having two ends and at least one finger axially extending from each of said ends;
   said finger being one-piece formed with a cylindrical body forming said cylindrical member, and having radially inner and outer surfaces which are coaxial with said cylindrical body;
   said notches of the plate cam and the input member having radially inner surfaces which are coaxially disposed with said center holes and have the same radius as said radially outer surface of the finger;
   said plate cam being coupled with one of said ends of said cylindrical member and said input member being coupled with the other of said ends of said cylindrical member through tightly joining each notch of the plate cam and the input member with said at least one finger axially extending from each of said ends of the cylindrical member.

2. The rotary cam assembly as defined in claim 1, wherein both sides of said notches of the plate cam and the input member are formed parallel to each other.

3. The rotary cam assembly as defined in claim 1, wherein a pair of notches is provided in the center hole of the plate cam.

4. The rotary cam assembly as defined in claim 1, wherein a pair of notches is provided in the center hole of the input member.

5. The rotary cam assembly as defined in claim 1, wherein said plate cam and said input member have been formed by punching.

6. The rotary cam assembly as defined in claim 1, wherein each of said plate cam and said input member has a reference hole for angular positioning upon assembling.

7. The rotary cam assembly as defined in claim 1, wherein the notch is disposed in the wall portion of the plate cam at a position remote from the initial position of the cam surface thereof.

8. The rotary cam assembly as defined in claim 1, wherein the notch is disposed in the wall portion of the input member at a position remote from the initial position of the cam surface thereof.

* * * * *